United States Patent
McCarter et al.

(10) Patent No.: US 11,064,687 B2
(45) Date of Patent: Jul. 20, 2021

(54) ICE FISHING HOLE COVERING ASSEMBLY

(71) Applicants: Cody McCarter, Embarrass, MN (US);
Amber McCarter, Embarrass, MN (US)

(72) Inventors: Cody McCarter, Embarrass, MN (US);
Amber McCarter, Embarrass, MN (US)

( * ) Notice: Subject to any disclaimer, the term of this patent is extended or adjusted under 35 U.S.C. 154(b) by 341 days.

(21) Appl. No.: 16/037,659

(22) Filed: Jul. 17, 2018

(65) Prior Publication Data

US 2020/0022351 A1    Jan. 23, 2020

(51) Int. Cl.
*A01K 97/01*    (2006.01)
*A01K 69/00*    (2006.01)
*A01K 97/12*    (2006.01)
*A01K 89/08*    (2006.01)

(52) U.S. Cl.
CPC .............. *A01K 97/01* (2013.01); *A01K 69/00* (2013.01); *A01K 89/08* (2013.01); *A01K 97/125* (2013.01)

(58) Field of Classification Search
CPC ........ A01K 97/01; A01K 97/00; A01K 97/12; A01K 97/125; A01K 69/00; A01K 89/08
USPC ................... 43/17, 4, 16; 242/370, 398, 400
See application file for complete search history.

(56) References Cited

U.S. PATENT DOCUMENTS

| | | | | |
|---|---|---|---|---|
| 1,253,746 A | * | 1/1918 | Teeling | A01K 97/125 43/17 |
| 3,053,538 A | | 9/1962 | Roca | |
| D196,888 S | * | 11/1963 | Pilsner | D10/109.1 |
| 3,134,188 A | * | 5/1964 | Petersen | A01K 97/01 43/17 |
| 3,423,867 A | * | 1/1969 | Bartletti | A01K 97/01 43/17 |
| 3,470,647 A | | 10/1969 | Horner | |
| 3,813,891 A | * | 6/1974 | Wootten | A01K 97/01 62/56 |
| 4,246,716 A | * | 1/1981 | Elmer | A01K 97/01 43/17 |
| 4,685,240 A | | 8/1987 | Fralick | |
| 4,845,878 A | | 7/1989 | Hackel | |
| 4,862,627 A | * | 9/1989 | Keller | A01K 97/01 43/17 |
| 4,901,468 A | * | 2/1990 | Blackledge | A01K 93/02 43/17 |
| 4,934,090 A | * | 6/1990 | Storey | A01K 97/01 43/16 |
| 4,944,114 A | * | 7/1990 | Burton | A01K 97/00 43/113 |

(Continued)

*Primary Examiner* — Darren W Ark
*Assistant Examiner* — Kevin M Dennis

(57) ABSTRACT

An ice fishing hole covering assembly includes a unitary fishing hole covering with a panel that is rigid and has a top side, a bottom side and a perimeter edge. The top side is planar and the panel is translucent with a circular shape and a central axis. A reel is rotatably coupled to the bottom side of the panel and has fishing line spooled thereon. The panel has a plurality of apertures therein extending to the top side and outwardly through the bottom side to define finger grips. A strike indicator is attached to the bottom side of the panel and includes a light emitter that is turned on when the fishing line is pulled downwardly from the bottom side. An entirety of the unitary structure is positioned no higher than 0.30 inches above a plane of the top side before and after actuation of the strike indicator.

18 Claims, 4 Drawing Sheets

(56) References Cited

U.S. PATENT DOCUMENTS

| | | | |
|---|---|---|---|
| 4,953,317 A * | 9/1990 | Ruchel | A01K 97/01 43/17 |
| 5,044,108 A * | 9/1991 | Rinehart | A01K 97/01 43/17 |
| 5,074,072 A * | 12/1991 | Serocki | A01K 97/01 43/17 |
| 5,168,651 A * | 12/1992 | Wilson | A01K 91/06 43/15 |
| 5,339,558 A | 8/1994 | Monsen | |
| 5,564,213 A | 10/1996 | Rinehart | |
| 5,956,882 A * | 9/1999 | Deimel | A01K 97/01 43/4 |
| 6,675,523 B1 * | 1/2004 | Huiras | A01K 97/01 43/4 |
| 6,857,218 B1 * | 2/2005 | Grahl | A01K 97/01 43/17 |
| 7,178,283 B1 * | 2/2007 | Dockal | A01K 91/02 43/43.11 |
| D556,799 S * | 12/2007 | Wang | D15/199 |
| 8,701,333 B2 * | 4/2014 | Christianson | A01K 97/01 43/17 |
| 8,756,854 B1 * | 6/2014 | Michaels | A01K 97/01 43/17 |
| 8,943,733 B2 * | 2/2015 | Katz | A01K 97/01 43/4 |
| 9,420,775 B1 * | 8/2016 | Ridler | A01K 97/125 |
| 10,412,943 B2 * | 9/2019 | Hartsock | A01K 89/081 |
| 10,624,330 B1 * | 4/2020 | Zierden | A01K 97/01 |
| 2002/0088164 A1 * | 7/2002 | Koepke | A01K 97/01 43/1 |
| 2005/0034348 A1 * | 2/2005 | Grahl | A01K 97/01 43/17 |
| 2010/0242337 A1 * | 9/2010 | Cummings | A01K 97/01 43/17.5 |
| 2011/0056112 A1 * | 3/2011 | Christianson | A01K 97/10 43/17 |
| 2011/0278860 A1 * | 11/2011 | Lupinacci | A01K 87/007 290/1 R |
| 2012/0233905 A1 * | 9/2012 | Holt | A01K 97/01 43/4 |
| 2012/0246994 A1 * | 10/2012 | Katz | A01K 97/01 43/4 |
| 2012/0291332 A1 * | 11/2012 | Nolf | A01K 97/01 43/17 |
| 2014/0237886 A1 * | 8/2014 | Taboada | A01K 97/125 43/4.5 |
| 2015/0257375 A1 * | 9/2015 | Byrd | A01K 93/00 43/17 |
| 2017/0099824 A1 * | 4/2017 | Manasco, Sr. | A01K 97/125 |
| 2020/0163320 A1 * | 5/2020 | Tibbetts | A01K 97/01 |

* cited by examiner

ICE FISHING HOLE COVERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to ice fishing hole covers and more particularly pertains to a new ice fishing hole cover for that overcomes prior deficiencies with covers wherein the covers include upwardly extending features that are readily caught on a person's clothing or feet. Furthermore, such upwardly extending features are easily tripped over by children or accessible to pets, particularly when there are multiple persons or animals located within an ice fishing house where there are a plurality of ice fishing holes. While it has been important to cover the ice fishing holes to prevent persons or animals tripping on their edges or falling into them, there is still a need to be able to determine if a fish has struck a fishing line without including structural elements which can make the ice fishing house unsafe. Therefore, the ice fishing hole cover described herein overcomes the inherent dangers and complications of prior covers by allowing a person to have a self contained cover, fishing reel and fish strike indicator wherein all elements thereof are positioned on a bottom side of the cover.

BRIEF SUMMARY OF THE INVENTION

An embodiment of the disclosure meets the needs presented above by generally comprising a unitary fishing hole covering including a panel that is rigid and has a top side, a bottom side and a perimeter edge. The top side is planar and the panel is translucent with a circular shape and a central axis. A reel is rotatably coupled to the bottom side of the panel and has fishing line spooled thereon. The panel has a plurality of apertures therein extending to the top side and outwardly through the bottom side and defining finger grips. A strike indicator is attached to the bottom side of the panel and is operationally coupled to the reel. The strike indicator comprises a light emitter that is turned on when the fishing line is pulled downwardly from the bottom side. An entirety of the unitary structure is positioned no higher than 0.30 inches above a plane of the top side before and after actuation of the strike indicator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
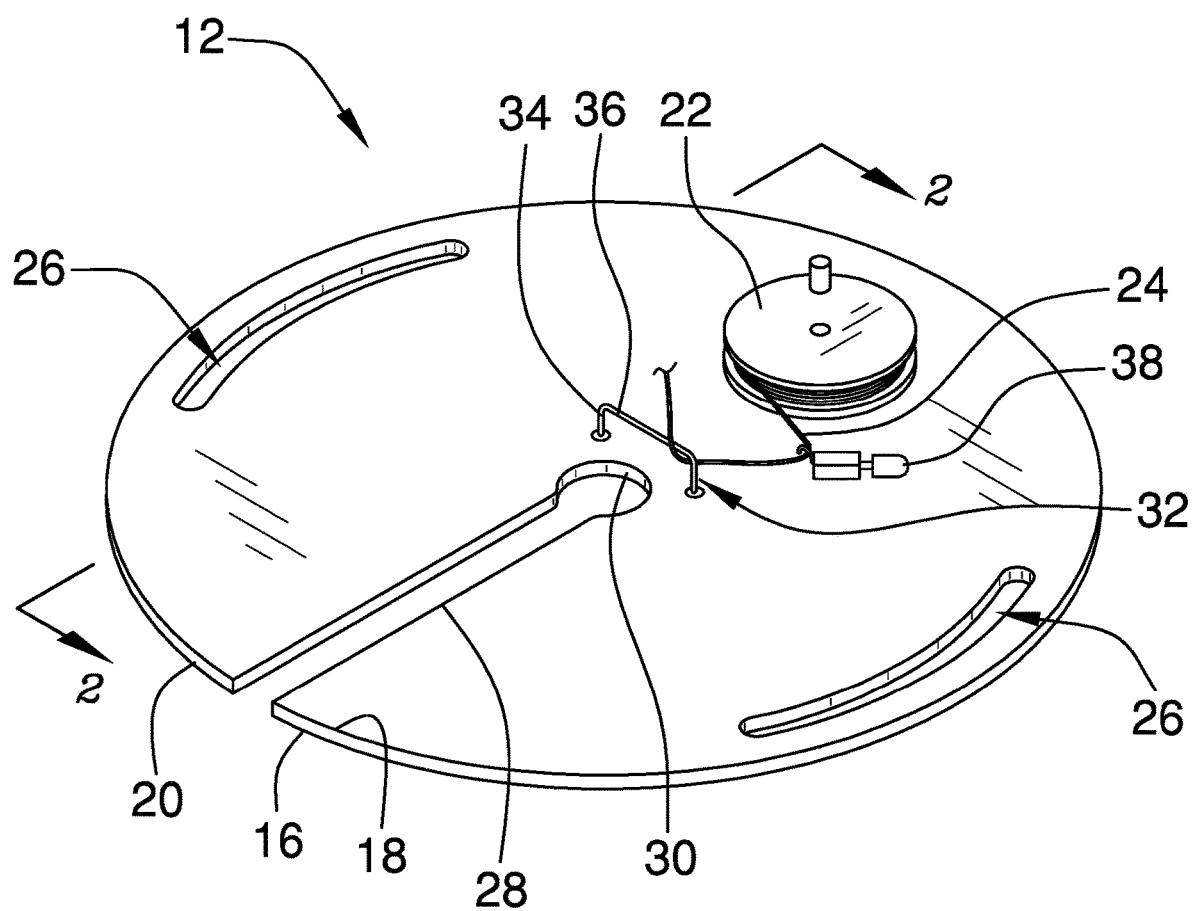
FIG. 1 is a bottom isometric view of an ice fishing hole covering assembly according to an embodiment of the disclosure.
Figure 2:
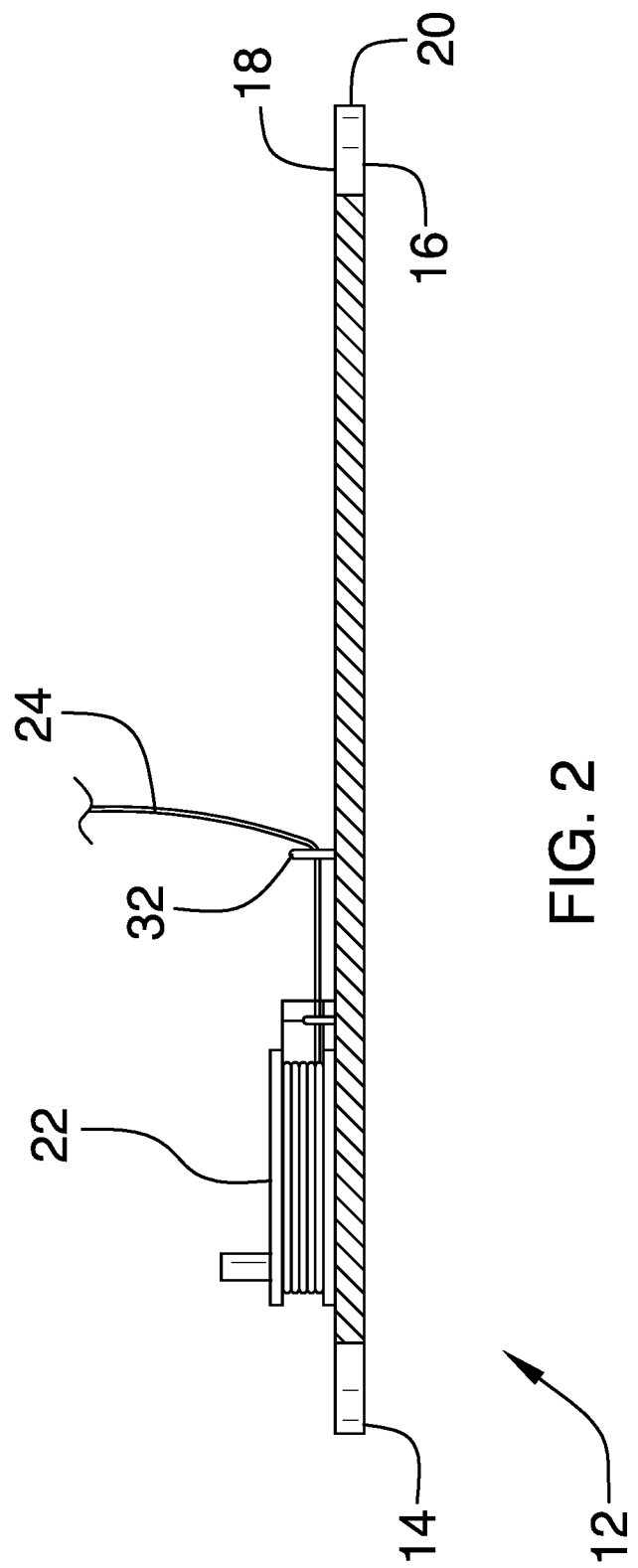
FIG. 2 is a cross-sectional view of an embodiment of the disclosure taken along line 2-2 of FIG. 1.
Figure 3:
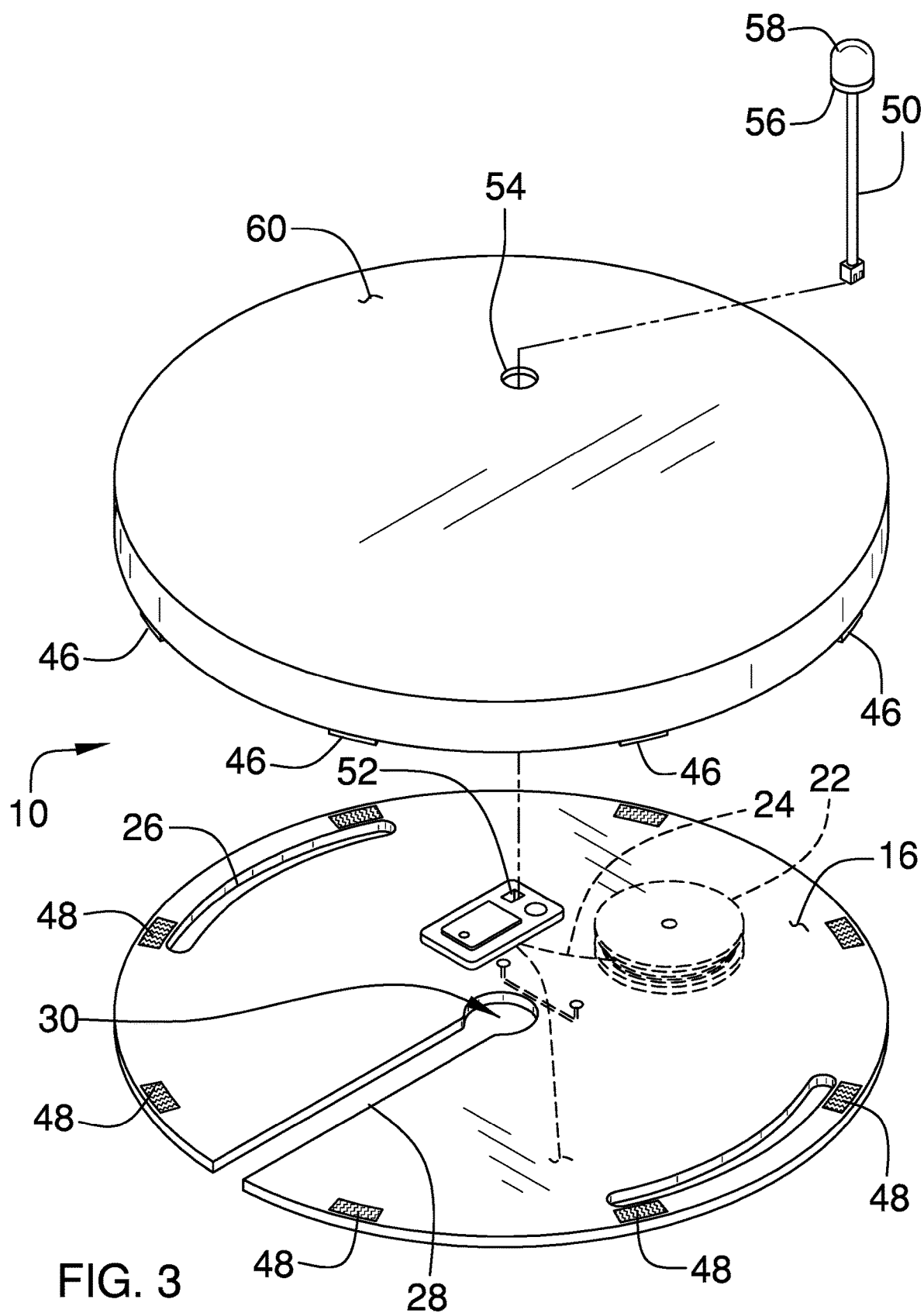
FIG. 3 is a top isometric view of an embodiment of the disclosure.
Figure 4:
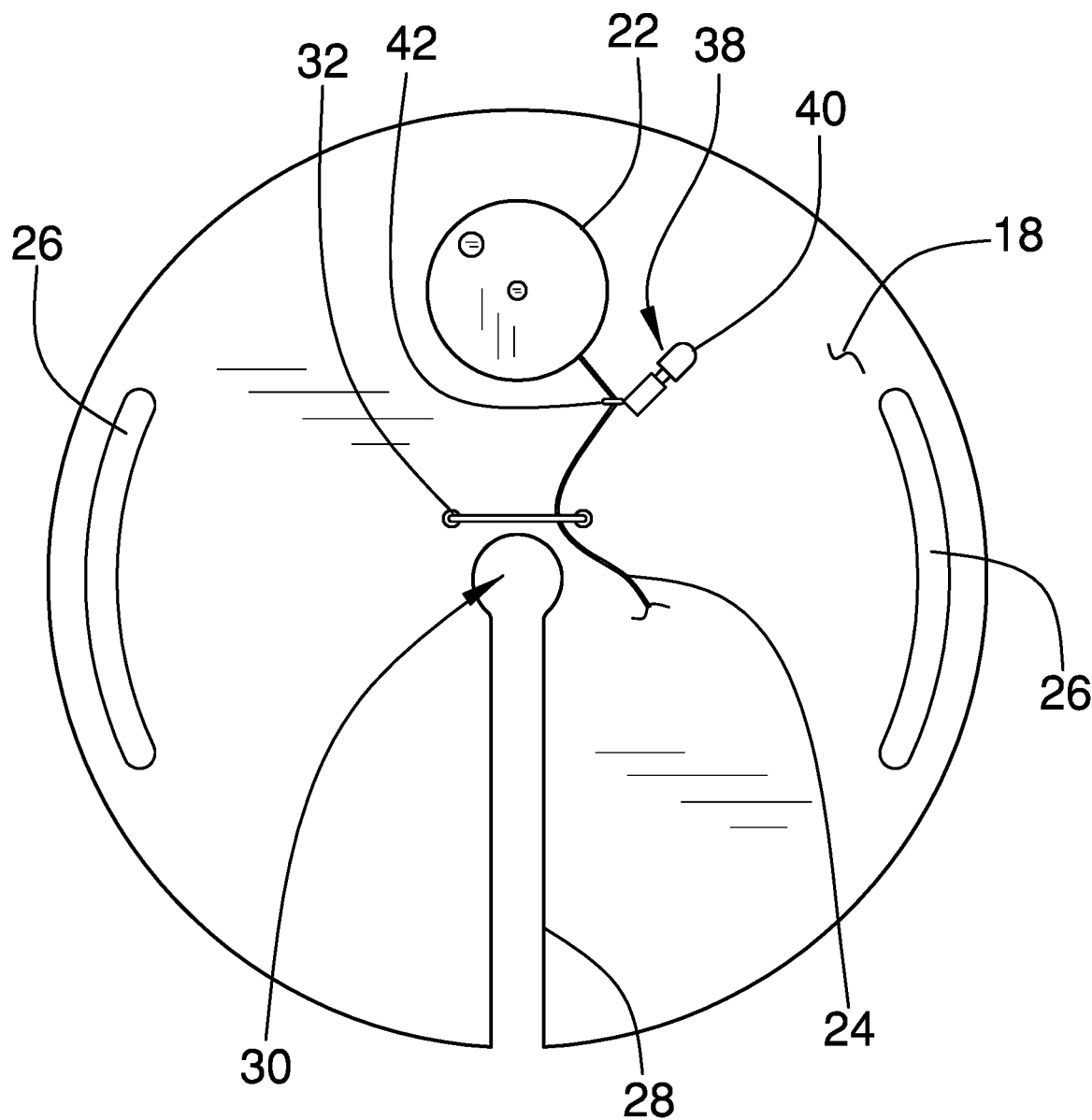
FIG. 4 is a bottom isometric view of an embodiment of the disclosure.

With reference now to the drawings, and in particular to FIGS. 1 through 4 thereof, a new ice fishing hole cover embodying the principles and concepts of an embodiment of the disclosure and generally designated by the reference numeral 10 will be described.

As best illustrated in FIGS. 1 through 4, the ice fishing hole covering assembly 10 generally comprises a unitary fishing hole covering 12 which includes a panel 14 that is rigid and has a top side 16, a bottom side 18 and a perimeter edge 20. The top side 16 is planar and the bottom 18 side may also be planer. The panel 14 is translucent and may be comprised of a transparent material. Specifically, the panel 14 may be comprised of a plastic material allowing a person to see through the panel 14. The panel 14 has a circular shape having a centrally located axis such that it will match the shape and size of a typical ice fishing hole which extends through ice on a body of water. The panel 14 will have a diameter between 6.0 inches and 12.0 inches and a height from the top side 16 to the bottom side 18 that is less than 1.5 inches.

A reel 22 is rotatably coupled to the bottom side 18 of the panel 14 and is configured to have fishing line 24 spooled thereon. The reel 22 has an axis of rotation orientated perpendicular to a plane of the bottom side 14 to facilitate rotation thereof by a user when the bottom side 18 of the panel 14 is moved to a vertical orientation such as when a fish is being reeled in. The reel 22 is offset from a central area of the panel 14.

The panel 14 has a plurality of apertures 26 therein extending to the top side 16 and outwardly through the bottom side 18. The apertures 26 define finger grips and allow a person to extend their fingers through the panel 14 and lift the panel 14 so that the bottom 18 and top 16 sides are vertically orientated and the person can access the reel 22. The apertures 26 are typically positioned between the perimeter edge 20 and the axis of the panel 14, though a central aperture may be utilized as well. In one embodiment, the apertures 26 are spaced from each other and are positioned on opposite sides of the axis as shown in FIG. 1. The apertures 26 each are elongated and arcuate to follow a contour of the perimeter edge 20. In other embodiments, the apertures 26 may comprise circular openings spaced out from each other having diameters between 0.75 inches and 1.5 inches. The panel 14 may further have a slot 28 therein extending into the perimeter edge 20 and through the top 16 and bottom 18 sides. The slot 28 has a terminal end 30 positioned at the axis of the panel 14. The slot 28 has a width between 0.5 inches and 1.0 inches and the terminal end 30 is arcuate. The slot 28 and terminal end 30 form additional gripping areas for a person using the assembly 10.

A line guide 32 is attached to the bottom side 18. The line guide 32 is configured to receive the fishing line 24 from the reel 22 and may be positioned between the reel 22 and the axis of the panel 14. The line guide 32 allows the fishing line 24 to change directions from a plane orientated parallel to the bottom side 18 as it comes off the reel 22 to a plane orientated perpendicular to the bottom side 18 as it extends downwardly through the ice fishing hole. The line guide 32 may comprise any form of loop structure and may, for example, include a pair of legs 34 attached to a crossbeam 36 wherein the legs 34 are each attached to the bottom side 18 so that the fishing line 24 may be positioned between the crossbeam 36 and the bottom side 18.

A strike indicator 38 is attached to the bottom side 18 of the panel 14 and is operationally coupled to the reel 22. The strike indicator 38 comprises a light emitter 40 that is turned on when the fishing line 24 is pulled downwardly from the bottom side 18. The strike indicator 38 is conventional to ice fishing and typically includes a trip switch 42 mechanically coupled to the reel 22 or to the fishing line 24 wherein the fishing line 24 being pulled downwardly into the ice fishing hole actuates the trip switch 42 and turns the light emitter 40 on.

An entirety of the unitary structure 12 is positioned no higher than 0.30 inches above a plane of the top side 16 before and after actuation of the strike indicator 38. Specifically, the only portions of the unitary structure 12 which may rise above the top side 16 would include, for example, ends of fasteners retaining the strike indicator 38, line guide 32, or reel 22 on the panel 12. Preferably, the unitary structure 12 would have no structures rising above a plane of the top side 16 such that the unitary structure 12 would have a completely flat top side 16. Furthermore, the above is intended to include the structural condition of the unitary structure 12 after actuation of the strike indicator 38. While prior art devices have included strike indicators that rise up, such as with a flag, after actuation thereof, the unitary structure 12 includes no elements that extend above the plane of the top side 16 either directly above the top side 16 or peripheral thereto.

An insulator 44 may be provided that is removably positioned on the top side 16 of the panel 14 to help insulate the air above the ice fishing hole to prevent its re-freezing. The insulator 44 comprises a disc of thermally insulated material and has a same shape as the panel 14. A coupler may be utilized that releasably couples the insulator 44 to the top side 16 of the panel 14 and may include, for example, a hook and loop coupler including a first mating section 46 attached to the insulator 44 and a second mating section 48 attached to the top side 16 of the panel 14.

In order to be alerted to a fish strike if the insulator 44 is opaque, a conduit 50 may be extendable through the insulator 44 and removably connected to a plug 52 in the strike indicator 38. The conduit 50 extends through an opening 54 in the insulator 44 and has a distal end 56 with respect to the strike indicator 38. A secondary light 58 is attached to the distal end 56 to electrically couple the secondary light 58 to the strike indicator 38. Thereafter, the secondary light 58 is turned on when the light emitter 40 is turned on. The secondary light 58 may be flush mounted in an upper surface 60 of the insulator 44 which is also planar.

In use, the assembly 10 is used as a typical ice fishing hole cover. However, its planar top side 16, which does not include structures extending upwardly therefrom, ensures that it will not catch onto or otherwise interfere with persons or animals moving around or over the ice fishing hole. The fishing line 24 is strung through the line guide 32 and its end will include conventional bait, lures, etc. which is dropped down through the hole. The fishing line 24 is also engaged with the strike indicator 38 and the unitary structure 12 is then placed over the ice fishing hole. When a fish strikes the fishing line 24, the strike indicator 38 is actuated to turn on the light emitter 40. The user then grips the panel 14, such that their palm is facing the top side 16 of the panel 14, and lifts the panel 14 upwardly so their free hand can rotate the reel 22 to bring the fish upwardly through the ice fishing hole.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cover and fishing reel combination assembly configured for positioning over an ice fishing hole to prevent objects from falling into the ice fishing hole, the assembly comprising:
  a unitary fishing hole covering including:
    a panel being rigid and having a top side; a bottom side and a perimeter edge, the top side being planar, the panel being translucent, the panel having a circular shape and having an axis;

a reel being rotatably coupled to the bottom side of the panel and being configured to have fishing line spooled thereon;

the panel having a plurality of apertures therein extending to the top side and outwardly through the bottom side and defining finger grips;

a strike indicator being attached to the bottom side of the panel and being operationally coupled to the reel, the strike indicator comprising a light emitter being turned on when the fishing line is pulled downwardly from the bottom side to actuate the strike indicator; and the top side of the panel being an uppermost planar surface of the unitary fishing hole covering before and after actuation of the strike indicator.

2. The cover and fishing reel combination assembly according to claim 1, wherein the panel has a diameter between 6.0 inches and 12.0 inches.

3. The cover and fishing reel combination assembly according to claim 1, wherein the panel has a height from the top side to the bottom side being less than 1.5 inches.

4. The cover and fishing reel combination assembly according to claim 1, wherein the reel has an axis of rotation orientated perpendicular to a plane of the bottom side.

5. The cover and fishing reel combination assembly according to claim 4, wherein the reel is offset from a central area of the panel.

6. The cover and fishing reel combination assembly according to claim 1, wherein the apertures are positioned between the perimeter edge and the axis of the panel.

7. The cover and fishing reel combination assembly according to claim 6, wherein the apertures are spaced from each other and are positioned on opposite sides of the axis of the panel.

8. The cover and fishing reel combination assembly according to claim 7, wherein the apertures each are elongated.

9. The cover and fishing reel combination assembly according to claim 8, wherein each of the apertures is arcuate and follows a contour of the perimeter edge.

10. The cover and fishing reel combination assembly according to claim 1, wherein the panel has a slot therein extending into the perimeter edge and through the top and bottom sides, the slot having a terminal end positioned at the axis of the panel.

11. The cover and fishing reel combination assembly according to claim 10, the slot having a width between 0.5 inches and 1.0 inches.

12. The cover and fishing reel combination assembly according to claim 10, wherein the terminal end is arcuate.

13. The cover and fishing reel combination assembly according to claim 1, wherein the unitary fishing hole covering further includes a line guide being attached to the bottom side, the line guide being configured to receive the fishing line from the reel.

14. The cover and fishing reel combination assembly according to claim 13, wherein the line guide is positioned between the reel and the axis of the panel.

15. The cover and fishing reel combination assembly according to claim 1, further including an insulator being removably positioned on the top side of the panel, the insulator comprising a disc of thermally insulated material, the insulator having the same circular shape of the panel.

16. The cover and fishing reel combination assembly according to claim 15, further including a coupler releasably coupling the insulator to the top side of the panel.

17. The cover and fishing reel combination assembly according to claim 15, further including a conduit being extendable through the insulator and being removably connected to the strike indicator, the conduit extending through an opening in the insulator, the conduit having a distal end with respect to the strike indicator, a secondary light being attached to the distal end to electrically couple the secondary light to the strike indicator, the secondary light being turned on when the light emitter is turned on.

18. A cover and fishing reel combination assembly configured for positioning over an ice fishing hole to prevent objects from falling into the ice fishing hole, the assembly comprising:

a unitary fishing hole covering including:

a panel being rigid and having a top side, a bottom side and a perimeter edge, the top side being planar, the panel being translucent, the panel having a circular shape and having an axis, the panel having a diameter between 6.0 inches and 12.0 inches, the panel having a height from the top side to the bottom side being less than 1.5 inches;

a reel being rotatably coupled to the bottom side of the panel and being configured to have fishing line spooled thereon, the reel having an axis of rotation orientated perpendicular to a plane of the bottom side, the reel being offset from a central area of the panel;

the panel having a plurality of apertures therein extending to the top side and outwardly through the bottom side and defining finger grips, the apertures being positioned between the perimeter edge and the axis of the panel, the apertures being spaced from each other and being positioned on opposite sides of the axis of the panel, the apertures each being elongated, each of the apertures being arcuate and following a contour of the perimeter edge;

the panel having a slot therein extending into the perimeter edge and through the top and bottom sides, the slot having a terminal end positioned at the axis of the panel, the slot having a width between 0.5 inches and 1.0 inches, the terminal end being arcuate;

a line guide being attached to the bottom side, the line guide being configured to receive the fishing line from the reel, the line guide being positioned between the reel and the axis of the panel;

a strike indicator being attached to the bottom side of the panel and being operationally coupled to the reel, the strike indicator comprising a light emitter being turned on when the fishing line is pulled downwardly from the bottom side to actuate the strike indicator;

the top side of the panel being an uppermost planar surface of the unitary fishing hole covering before and after actuation of the strike indicator;

an insulator being removably positioned on the top side of the panel, the insulator comprising a disc of thermally insulated material, the insulator having a same shape as the panel;

a coupler releasably coupling the insulator to the top side of the panel; and a conduit being extendable through the insulator and being removably connected to the strike indicator, the conduit extending through an opening in the insulator, the conduit having a distal end with respect to the strike indicator, a secondary light being attached to the distal end to electrically couple the secondary light to the strike indicator, the secondary light being turned on when the light emitter is turned on.

* * * * *